United States Patent
Sakuma

(10) Patent No.: US 10,552,716 B2
(45) Date of Patent: Feb. 4, 2020

(54) APPARATUS, METHOD, AND PROGRAM FOR CAUSING MULTICORE PROCESSOR TO EXECUTE TASKS, AND RECORDING MEDIUM STORING THE PROGRAM

(71) Applicant: Konica Minolta, Inc., Chiyoda-ku, Tokyo (JP)

(72) Inventor: Keishi Sakuma, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 158 days.

(21) Appl. No.: 15/074,379

(22) Filed: Mar. 18, 2016

(65) Prior Publication Data
US 2016/0283265 A1 Sep. 29, 2016

(30) Foreign Application Priority Data
Mar. 26, 2015 (JP) ................................. 2015-064435

(51) Int. Cl.
*G06K 15/02* (2006.01)
(52) U.S. Cl.
CPC ................................ *G06K 15/1856* (2013.01)
(58) Field of Classification Search
CPC . G06K 15/1856; G06F 3/1203; G06F 3/1229; G06F 3/1237
See application file for complete search history.

(56) References Cited

U.S. PATENT DOCUMENTS

| | | | |
|---|---|---|---|
| 2007/0070383 A1* | 3/2007 | Fujimori | H04N 1/32138 358/1.13 |
| 2009/0187261 A1 | 7/2009 | Otsuka et al. | |
| 2012/0162707 A1* | 6/2012 | Takenaka | G06K 15/1822 358/1.15 |
| 2013/0114100 A1* | 5/2013 | Torii | G06F 11/0733 358/1.14 |

(Continued)

FOREIGN PATENT DOCUMENTS

| | | |
|---|---|---|
| CN | 103198450 | 7/2013 |
| JP | 2009-175971 A | 8/2009 |

(Continued)

OTHER PUBLICATIONS

Office Action (Notice of Reasons for Rejection) dated May 9, 2017, by the Japanese Patent Office in corresponding Japanese Patent Application No. 2015-064435, and an English Translation of the Office Action. (11 pages).

(Continued)

*Primary Examiner* — Sisley N Kim
(74) *Attorney, Agent, or Firm* — Buchanan Ingersoll & Rooney PC

(57) ABSTRACT

An apparatus capable of executing a system control application generating system control tasks for system control and a machine control application for machine control under a general-purpose operating system includes a control unit configured to generate a plurality of identical periodic tasks of periodically performing a predetermined process related to the machine control, and cause at least two cores of a (Continued)

multicore processor to execute the generated periodic tasks, the multicore processor having a plurality of cores including the at least two cores.

7 Claims, 9 Drawing Sheets

(56) References Cited

U.S. PATENT DOCUMENTS

| | | | | |
|---|---|---|---|---|
| 2014/0063526 A1* | 3/2014 | Yamakawa | ........ | G06K 15/4055 |
| | | | | 358/1.13 |
| 2015/0153977 A1* | 6/2015 | Tanaka | .................. | G06F 3/1229 |
| | | | | 358/1.14 |
| 2015/0298153 A1* | 10/2015 | Baker | ..................... | B05B 12/12 |
| | | | | 438/7 |
| 2016/0147568 A1 | 5/2016 | Poledna et al. | | |

FOREIGN PATENT DOCUMENTS

| | | |
|---|---|---|
| JP | 2013-125549 A | 6/2013 |
| WO | 2014/205467 A1 | 12/2014 |
| WO | 2014205467 | 12/2014 |

OTHER PUBLICATIONS

Office Action issued in corresponding Chinese Patent Application No. 201610164637.3, dated Feb. 27, 2018. (14 pages).

* cited by examiner

APPARATUS, METHOD, AND PROGRAM FOR CAUSING MULTICORE PROCESSOR TO EXECUTE TASKS, AND RECORDING MEDIUM STORING THE PROGRAM

The entire disclosure of Japanese Patent Application No. 2015-064435 filed on Mar. 26, 2015 including description, claims, drawings, and abstract are incorporated herein by reference in its entirety.

BACKGROUND OF THE INVENTION

Field of the Invention

The present invention relates to an apparatus, a method, and a program for causing a multicore processor to execute tasks, and to a recording medium storing the program.

Description of the Related Art

Control to be performed in an image forming apparatus can be classified into the two types: system control such as management of the user interface, networks, and print jobs, and control on printing processes; and machine control such as control on the machine components of the image forming apparatus. Normally, system control is performed by the main CPU (Central Processing Unit), and machine control is performed by a special-purpose microprocessor. In recent years, performance of CPUs has improved, and there has been a demand for lower costs. In view of this, system control and machine control need to be performed by a single CPU.

Where system control and machine control are performed by a single CPU, there is a need to achieve both the functionality required in system control and the real-time properties required in machine control. However, in an environment using a general-purpose OS (Operating System), it is difficult to maintain the real-time properties in machine control.

According to a conventional technology disclosed in JP 2013-125549 A, in a multicore platform, the next core to execute the work thread with the highest priority level is determined based on the load conditions of cores. In parallel with execution of the work thread, the core executing the work thread transfers the necessary data for executing the work thread to the determined core. With this, the software real-time properties of the work thread that is periodically executed are maintained.

However, there are causes of degradation of real-time properties in a multicore environment. The above described conventional technology can prevent degradation of software real-time properties due to a time lag between the instruction to execute a word thread after task migration and the actual start of the execution, but cannot prevent degradation of real-time properties caused by other factors. As a result, the real-time properties required in machine control cannot be maintained.

The above problem is seen not only in image forming apparatuses, but also in any apparatus that performs system control and machine control with a single CPU.

SUMMARY OF THE INVENTION

The present invention has been made so as to solve such a problem. Specifically, the present invention aims to provide an apparatus that can secure the real-time properties required in machine control while maintaining functionality in system control in a case where a general-purpose OS is used in a multicore processor.

The above object of the present invention can be achieved with the means described below.

(1) To achieve the abovementioned object, according to an aspect, an apparatus capable of executing a system control application the generates system control tasks for system control and a machine control application for machine control under a general-purpose operating system, reflecting one aspect of the present invention comprises a control unit that generates identical periodic tasks of periodically performing a predetermined process related to the machine control, and causes two or more cores of a multicore processor to execute the generated periodic tasks, the multicore processor having cores including the two or more cores.

(2) The apparatus of Item. 1, wherein the control unit preferably further determines the number of periodic tasks to be generated based on the load condition of the multicore processor, generates the determined number of periodic tasks, and causes the cores to execute the generated periodic tasks.

(3) The apparatus of Item. 1, wherein the apparatus is preferably an image forming apparatus, and the control unit preferably determines the number of periodic tasks based on the operation mode of the image forming apparatus, generates the determined number of periodic tasks, and causes the cores to execute the generated periodic tasks.

(4) To achieve the abovementioned object, according to an aspect, a non-transitory recording medium storing a computer readable program as a machine control application to be executed for performing machine control in an apparatus capable of executing a system control application under a general-purpose operating system, the system control application generating system control tasks for system control, the program reflecting one aspect of the present invention causes a multicore processor to: generate identical periodic tasks of periodically performing a predetermined process related to the machine control; and cause two or more cores of the multicore processor to execute the generated periodic tasks, the multicore processor having cores including the two or more cores.

(5) The non-transitory recording medium storing a computer readable program of Item. 4 is preferably provided.

(6) To achieve the abovementioned object, according to an aspect, a method implemented in an apparatus capable of executing a system control application that generates system control tasks for system control and a machine control application for machine control under a general-purpose operating system, the method reflecting one aspect of the present invention comprises: generating identical periodic tasks of periodically performing a predetermined process related to the machine control; and causing two or more cores of a multicore processor to execute the generated periodic tasks, the multicore processor having cores including the two or more cores.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

First Embodiment

The following is a detailed description of an apparatus, a method, and a program for causing a multicore processor to execute tasks, and a recording medium storing the program according to a first embodiment of the present invention, with reference to the accompanying drawings.

Figure 1:
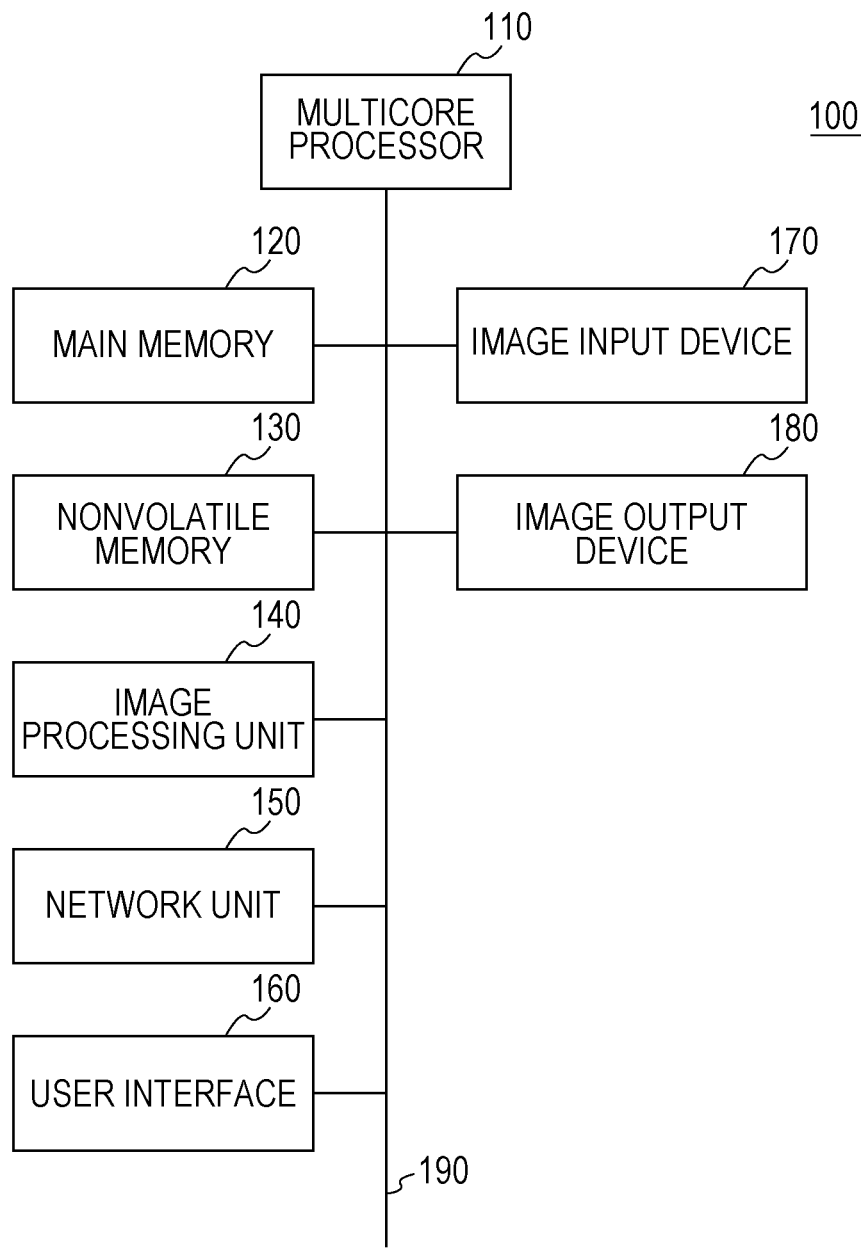
FIG. 1 is a block diagram of an image forming apparatus according to a first embodiment of the present invention.

FIG. 1 is a block diagram of an image forming apparatus as an example of an apparatus according to this embodiment of the present invention.

An image forming apparatus 100 includes a multicore processor 110, a main memory 120, a nonvolatile memory 130, an image processing unit 140, a network unit 150, a user interface 160, an image input device 170, and an image output device 180. In conjunction with the later described machine control program stored in the main memory 120 or the nonvolatile memory 130, the multicore processor 110, the main memory 120, and the nonvolatile memory 130 constitute a control unit.

The image input device 170 is a scanner, for example. The image input device 170 emits light from a light source such as a fluorescent lamp onto a document that is set in a predetermined read position on the platen. The image input device 170 photoelectrically converts the reflected light into an electrical signal with an imaging device such as a CCD (Charge Coupled Device) image sensor, and generates image data from the electrical signal.

The image output device 180 is an engine, for example. After charging, exposure, development, transfer, and fixing are performed in an electrophotographic process, the image output device 180 forms an image on a paper sheet based on image data, and outputs the result.

The image processing unit 140 performs a layout process and rasterizing process on print data contained in a print job received by the network unit 150, and generates image data.

The print job is a general print instruction issued to the image forming apparatus 100, and contains print data and print settings. The print data is the data of the document to be printed, and include various kinds of data, such as image data, vector data, and text data. Specifically, the print data may be PDL (Page Description Language) data, PDF (Portable Document Format) data, or TIFF (Tagged Image File Format) data. The print settings are settings related to image formation on a paper sheet and the settings related to the post processing to be performed on the printed image. For example, the print settings include various kinds of settings related to gray scale or full color, 2 in 1, double-side printing, stapling, punching, folding, and the like.

The network unit 150 is an interface for conducting communication between the image forming apparatus 100 and an external device, and may be a local interface such as a network interface compliant with the Ethernet (a registered trade name), SATA, PCI Express, USB, IEEE1394, or the like, or a wireless communication interface compliant with Bluetooth (a registered trade name), IEEE802.11, or the like.

The user interface 160 may be formed with a touch panel through which various settings are to be input, a numeric keypad for setting the number of copies to be made or the like, a start key for issuing an instruction to start an operation, a stop key for issuing an instruction to stop an operation, a reset key for initializing various setting conditions, and the like.

The multicore processor 110 is a processor in which cores are integrated. The cores include a logical circuit for performing arithmetic processing, and a cache memory.

The main memory 120 is formed with a RAM (Random Access Memory), for example, and temporarily stores programs to be executed by the multicore processor 110 and various kinds of data.

The nonvolatile memory 130 is formed with a ROM (Read Only Memory), a SSD (Solid State Drive), or a HDD (Hard Disk Drive), for example, and stores various programs including OS (Operating System), system control applications and machine control applications, and various kinds of data. The OS is the software to provide an interface that abstracts hardware to a user or application software. The OS runs under the multicore processor 110. The OS may be Linux, which is a general-purpose OS.

Figure 2:
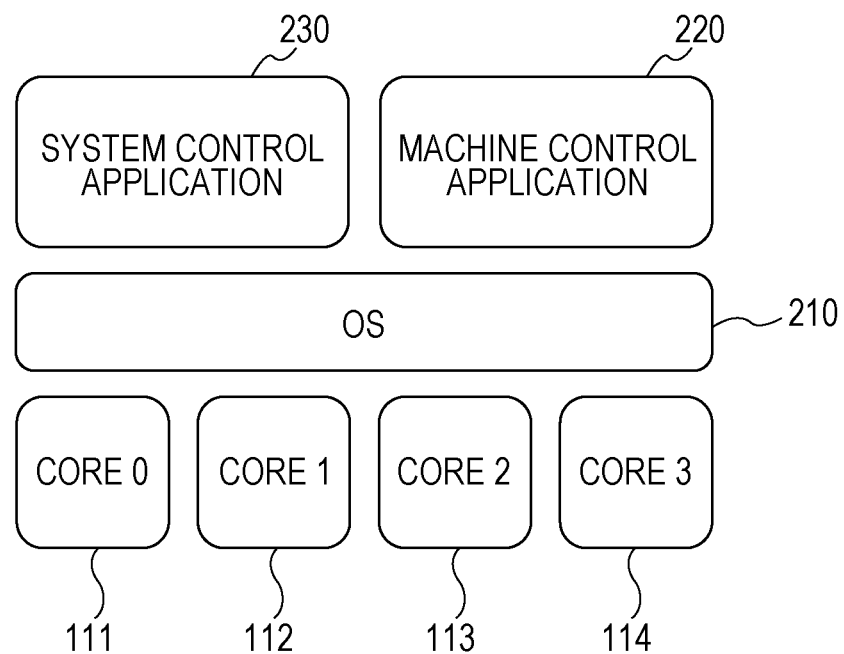
FIG. 2 is an explanatory diagram showing a structure including the OS that runs under a multicore processor, and a system control application and a machine control application that run under the OS.

FIG. 2 is an explanatory diagram showing a structure including the OS that runs under the multicore processor 110, and a system control application and a machine control application that run under the OS.

A system control application 230 is a program for causing the multicore processor 110 (or respective cores 111 through 114) to control the image processing unit 140, the network unit 150, the user interface 160, and peripheral devices, and manage print jobs. Hereinafter, control and management to be performed by the system control application 230 will be referred to as system control.

A machine control application 220 is a program for causing the multicore processor 110 to control and manage the machine unit formed with the machine components of the image input device 170 and the image output device 180. Hereinafter, management and control to be performed by the machine control application 220 will be referred to as machine control. The machine unit includes a motor, a sensor, a clutch, and a solenoid for conveying paper sheets, for example. The machine control application 220 controls the motor, the sensor, the clutch, and the solenoid for conveying paper sheets, and detects malfunction in those components during paper sheet conveyance or failure of paper sheet conveyance caused by those components.

The system control application 230 and the machine control application 220 generate tasks for the multicore processor 110 to perform system control and machine control. An OS 210 determines the execution sequence for the multicore processor 110 to execute tasks generated by the system control application 230 and the machine control application 220. The OS 210 determines which one of the cores 111 through 114 is to execute a task, and assigns the task to the selected one of the cores 111 through 114. Hereinafter, each task of performing system control will be referred to as a system control task, and each task of performing machine control will be referred to as a machine control task.

Figure 3:
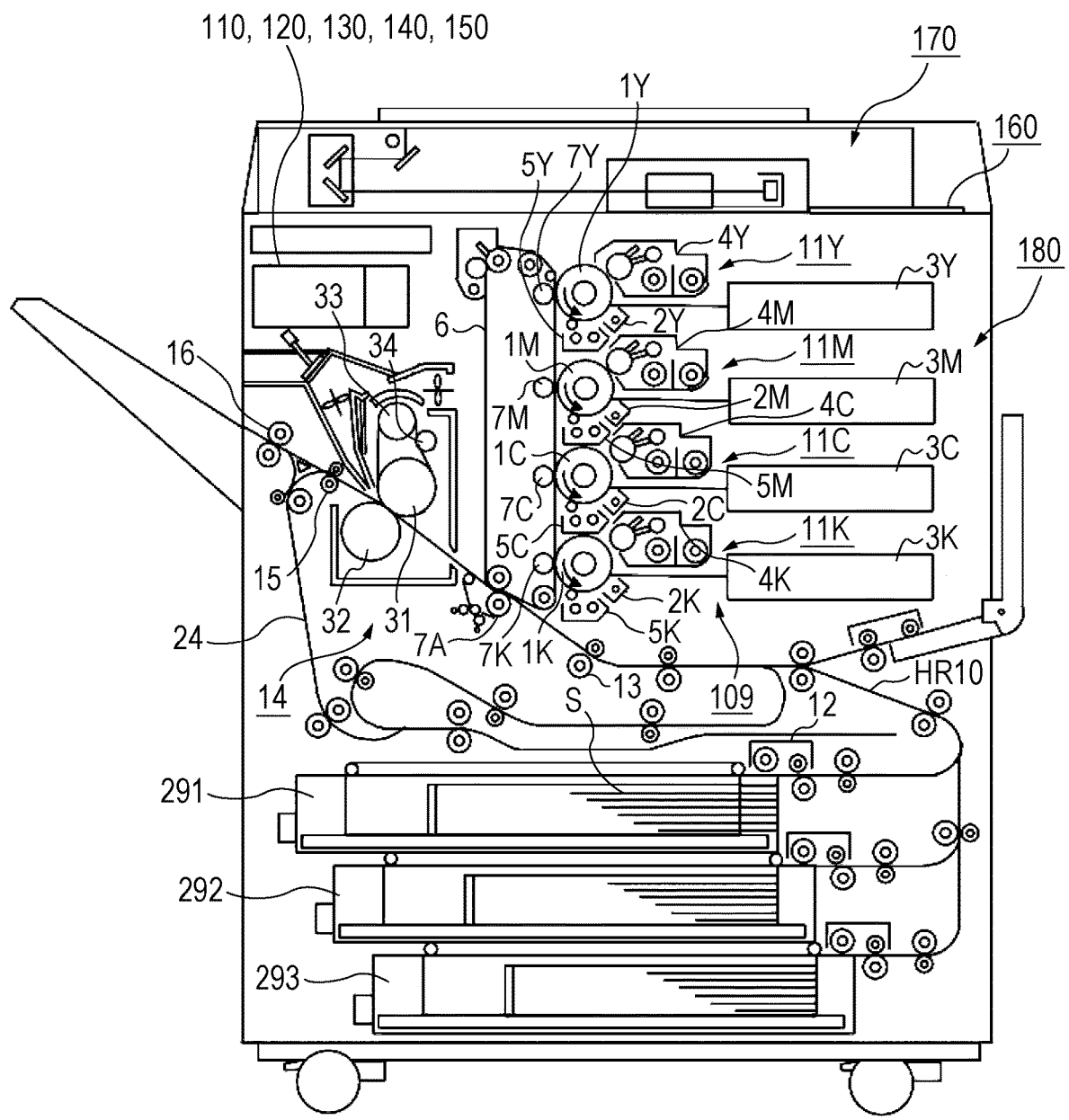
FIG. 3 is a diagram showing the structure of a tandem-type color image forming apparatus as an example of the image forming apparatus.

FIG. 3 is a diagram showing the structure of a tandem-type color image forming apparatus as an example of the image forming apparatus 100. The tandem-type color image forming apparatus performs color image formation with four image forming units.

A document placed on the platen is scanned and exposed by the optical system of the scanning exposure unit of the image input device 170, and the image thereof is read into a line image sensor. The image information signal obtained as a result of photoelectric conversion is subjected to analog processing, A/D conversion, shading correction, image compression, and the like in the image processing unit 140, and is then input to the optical writing units of the image forming units.

The four image forming units are an image forming unit 11Y that forms images in yellow (Y), an image forming unit 11M that forms images in magenta (M), an image forming unit 11C that forms images in cyan (C), and an image forming unit 11K that forms images in black (K), and are denoted by the common reference numeral 11 accompanied by Y, M, C, and K, which represent the respective colors in which images are formed.

The image forming unit 11Y includes a photosensitive drum 1Y, and a charging unit 2Y, an optical writing unit 3Y, a development device 4Y, and a drum cleaner 5Y, which are placed around the photosensitive drum 1Y.

Likewise, the image forming unit 11M includes a charging unit 2M, an optical writing unit 3M, a development device 4M, and a drum cleaner 5M placed around a photosensitive drum 1M, the image forming unit 11C includes a charging unit 2C, an optical writing unit 3C, a development device 4C, and a drum cleaner 5C placed around a photosensitive drum 1C, and the image forming unit 11K includes a charging unit 2K, an optical writing unit 3K, a development device 4K, and a drum cleaner 5K placed around a photosensitive drum 1K.

In the image forming units 11Y, 11M, 11C, and 11K, the photosensitive drums 1Y, 1M, 1C, and 1K have the same structures, the charging units 2Y, 2M, 2C, and 2K have the same structures, the optical writing units 3Y, 3M, 3C, and 3K have the same structures, the development devices 4Y, 4M, 4C, and 4K have the same structures, and the drum cleaners 5Y, 5M, 5C, and 5K have the same structures.

The image forming units 11Y, 11M, 11C, and 11K write image information signals on the photosensitive drums 1Y, 1M, 1C, and 1K with the optical writing units 3Y, 3M, 3C, and 3K, and form latent images based on the image information signals on the photosensitive drums 1Y, 1M, 1C, and 1K, respectively. The latent images are developed by the development devices 4Y, 4M, 4C, and 4K, so that toner images are formed as visible images on the photosensitive drums 1Y, 1M, 1C, and 1K.

An image in yellow (Y), an image in magenta (M), an image in cyan (C), and image in black (K) are formed on the photosensitive drums 1Y, 1M, 1C, and 1K of the image forming units 11Y, 11M, 11C, and 11K, respectively.

An intermediate transfer belt 6 is wound around rollers, and are movably supported by the rollers.

The toner images in the respective colors formed by the image forming units 11Y, 11M, 11C, and 11K are sequentially transferred onto the moving intermediate transfer belt 6 by primary transfer units 7Y, 7M, 7C, and 7K, so that a color image in which the toner layers of the respective colors Y (yellow), M (magenta), C (cyan), and K (black) are superimposed on one another is formed (the color image will be hereinafter referred to as the "toner image").

A sheet conveying unit HR10 conveys paper sheets S. The paper sheets S are stored in sheet feed trays 291, 292, and 293. A paper sheet S is fed to a secondary transfer unit 7A by a first sheet feeing unit 12 via resist rollers 13, and the toner image on the intermediate transfer belt 6 is transferred on to the paper sheet S. The secondary transfer unit 7A is an example of a transfer unit. The secondary transfer unit 7A transfers the toner image onto the paper sheet S, and conveys the paper sheet S.

The paper sheet S having the toner image transferred thereonto is subjected to heat and pressure by a fixing unit 14, so that the toner image on the paper sheet S is fixed. The paper sheet S on which an image is formed through the toner image transfer and fixing is discharged from the apparatus via a fixing/conveying roller 15 and a sheet ejecting roller 16.

The fixing unit 14 includes a fixing roller 31, a pressing roller 32, a heating roller 33, and a fixing belt 34. The pressing roller 32 pushes the fixing roller 31, to form an arc-like nip region so that the side of the paper sheet S on which the toner image is formed becomes convexed. In the nip region, the paper sheet S and the fixing belt 34, which is heated by the heating roller 33, are nipped. The toner of the toner image adhering to the paper sheet S is then heated and pressed, so that the toner image is fixed to the paper sheet S. The fixing unit 14 is an example of a fixing unit. The fixing unit 14 fixes the toner image, which has been transferred onto the paper sheet S by the secondary transfer unit 7A, to the paper sheet S, and then conveys the paper sheet S.

The image forming apparatus 100 includes a sheet reversing unit 24. Accordingly, a paper sheet already subjected to fixing can be sent from the fixing/conveying roller 15 to the sheet reversing unit 24, be reversed, and be then discharged. Further, image formation can be performed on both sides of a paper sheet.

Through the user interface 160 installed in an upper portion of the main frame of the image forming apparatus 100, a size and a number of paper sheets S can be set prior to image formation. Further, through the user interface 160, a sheet type and various sheet conveyance conditions can be set.

Operations of the above described components of the image output device 180 for image formation and the operations of the components for conveying paper sheets S are controlled by the multicore processor 110 executing tasks.

Figure 4:
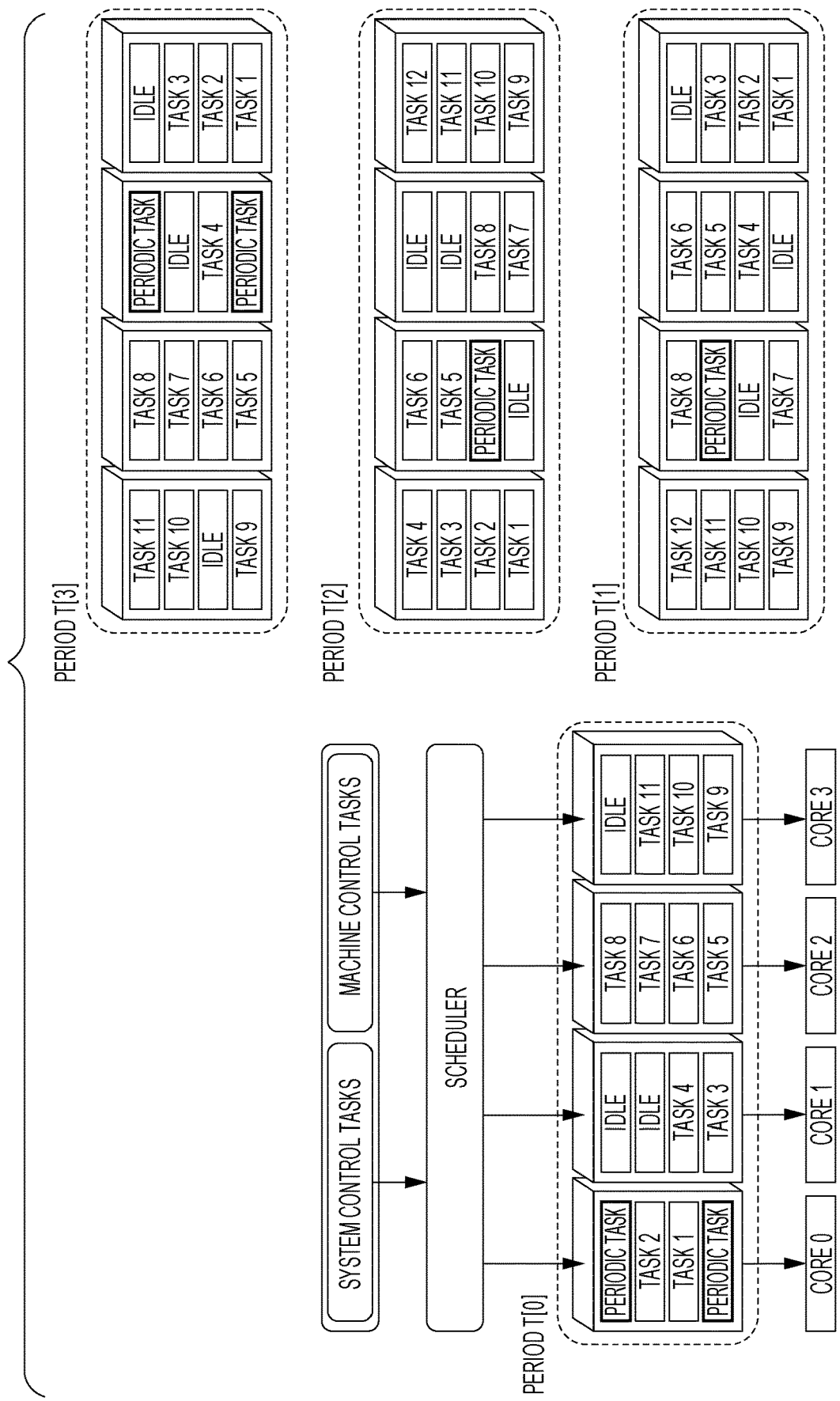
FIG. 4 is a diagram for explaining scheduling of task execution in a conventional apparatus.

FIG. 4 is a diagram for explaining scheduling of task execution in a conventional apparatus.

In task scheduling, one of the cores 111 through 114 of the multicore processor 110 is selected as the core to execute tasks, and the execution sequence for the core to execute the tasks is determined. A scheduler that is a function of the OS 210 registers system control tasks generated by the system control application 230 and machine control tasks generated by the machine control application 220 in the run queues of the corresponding cores. In this manner, task scheduling is performed. The run queues are stored in the main memory 120, and the tasks to be executed by the respective cores are registered in the execution sequence.

Here, the eventual job scheduling is performed by the scheduler that is a function of the OS 210. As for the system control application 230 and the machine control application 220, however, the timing to generate tasks and the timing to report (or hand over) the generated tasks to the OS 210 are changed, so that registration of the tasks in the run queues can be controlled.

In FIG. 4, T represents a period during which the scheduler performs scheduling, and the scheduler can perform the scheduling of a predetermined number of tasks in each one period T. For example, in each of periods T[0], T[1], T[2], and T[3], scheduling of four tasks is performed for each of the cores 111 through 114.

The periodic tasks enclosed by heavy lines in FIG. 4 are machine control tasks that need to be executed at regular time intervals. The periodic tasks include a machine control task of detecting malfunction in the machine unit of the image input device 170 and the image output device 180, for example. In the machine control task of detecting malfunction in the machine unit, within a predetermined period of time after malfunction is caused, malfunction detection needs to be performed, and measures for the detected malfunction need to be taken. Therefore, the machine control task of detecting malfunction in the machine unit is invariably executed at regular time intervals.

In sheet conveyance failure detection that is conducted during the machine control task of detecting malfunction in the machine unit, the position of the top end of a paper sheet is periodically detected with a sensor in conjunction with the amount of control on the number of steps of the motor, and malfunction is detected when any paper sheet is not detected in a position predicted from the amount of control on the number of steps. Malfunction detection, and stopping the motor or issuing an alarm as the measures for the detected malfunction need to be performed within a predetermined period of time after the malfunction is caused.

As shown in FIG. 4, at least one of the cores 111 through 114 executes a periodic task once in every three task processes.

In the respective periods T [0], T[1], T[2], and T [3], tasks with the same number are tasks of the same kind. For example, each task 1 is an image processing task that is a system control task. Tasks 1 through 10 are system control tasks, and tasks 11 and 12 and the periodic tasks are machine control tasks.

Figure 5:
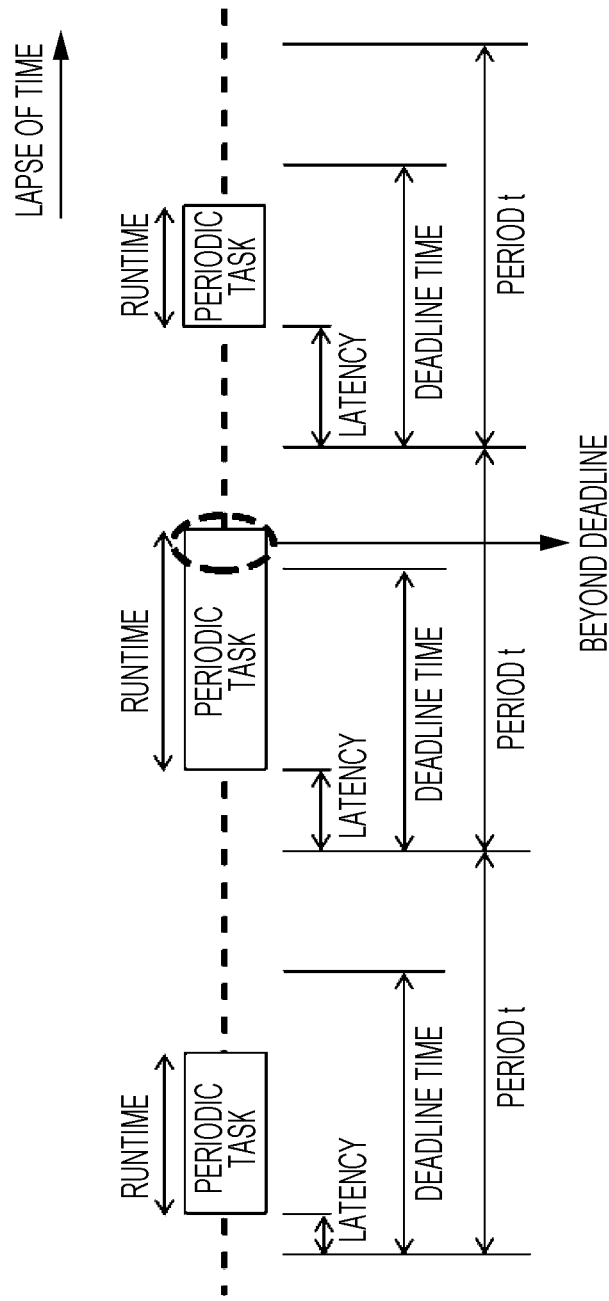
FIG. 5 is a diagram for explaining "deadline-over" of a periodic task.

FIG. 5 is a diagram for explaining "deadline-over" of a periodic task.

As indicated by a circle drawn with a heavy dashed line in FIG. 5, "deadline-over" means that completion of a task process exceeds the deadline time by which the task process needs to be completed. In FIG. 5, each process is a periodic task process. Latency is delay of a process start time scheduled for a periodic task. A runtime is the processing time required for a periodic task. A period t is a predetermined time assigned to one task. In FIG. 5, tasks other than periodic tasks are not shown, while only periodic tasks are shown.

The periodic tasks are scheduled to be executed at regular time intervals by the OS 210. However, in a multicore environment using the multicore processor 110, when task migration is conducted to scatter the loads on the cores 111 through 114, there are various causes of real-time property degradation, such as lower cache and TLB (Translation Lookaside Buffer) hit ratios, delay of completion of tasks executed prior to execution of periodic tasks, competition between memory buses, and a concentration of interrupts. Among the three periodic tasks shown in FIG. 5, the latency and the runtime of the second periodic task are longer, and as a result, the second periodic task has "deadline-over". Even in a case where scheduling is performed so that the periodic tasks are executed at regular time intervals as described above, there is a possibility of "deadline-over".

If there is "deadline-over" in executing a periodic task, the document conveyance precision might become lower, a paper jam might occur due to delay in jam detection, or a machine component might break down, for example.

For example, in a periodic task of performing a malfunction detection process such as jam detection, a process of suspending the conveying operation after a jam is detected needs to be completed within a predetermined period of time (the period t in FIG. 5) assigned to the period task. If the processing of the periodic task has "deadline-over", the processing delays due to suspension of the operation. As a result, the paper jam might worsen.

Figure 6:
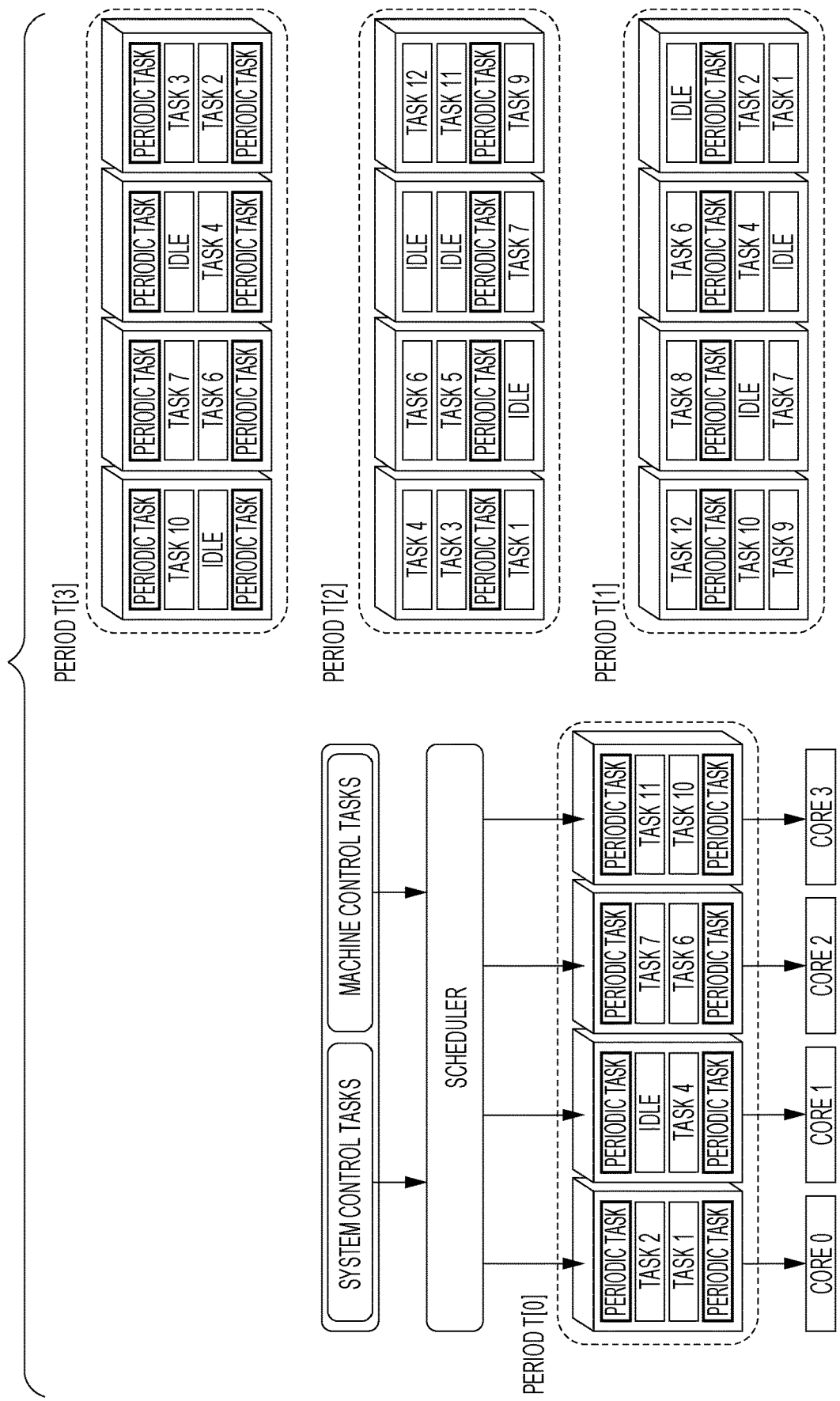
FIG. 6 is an explanatory diagram showing the results of scheduling of tasks in the image forming apparatus according to the first embodiment of the present invention.

FIG. 6 is an explanatory diagram showing the results of scheduling of tasks in the image forming apparatus 100 according to this embodiment. In FIG. 6, periodic tasks are assigned to the respective cores 111 through 114. Accordingly, even in a case where "deadline-over" occurs in one of the cores 111 through 114 with respect to a periodic task, the cores not having "deadline-over" can execute the periodic task while maintaining real-time properties.

Figure 7:
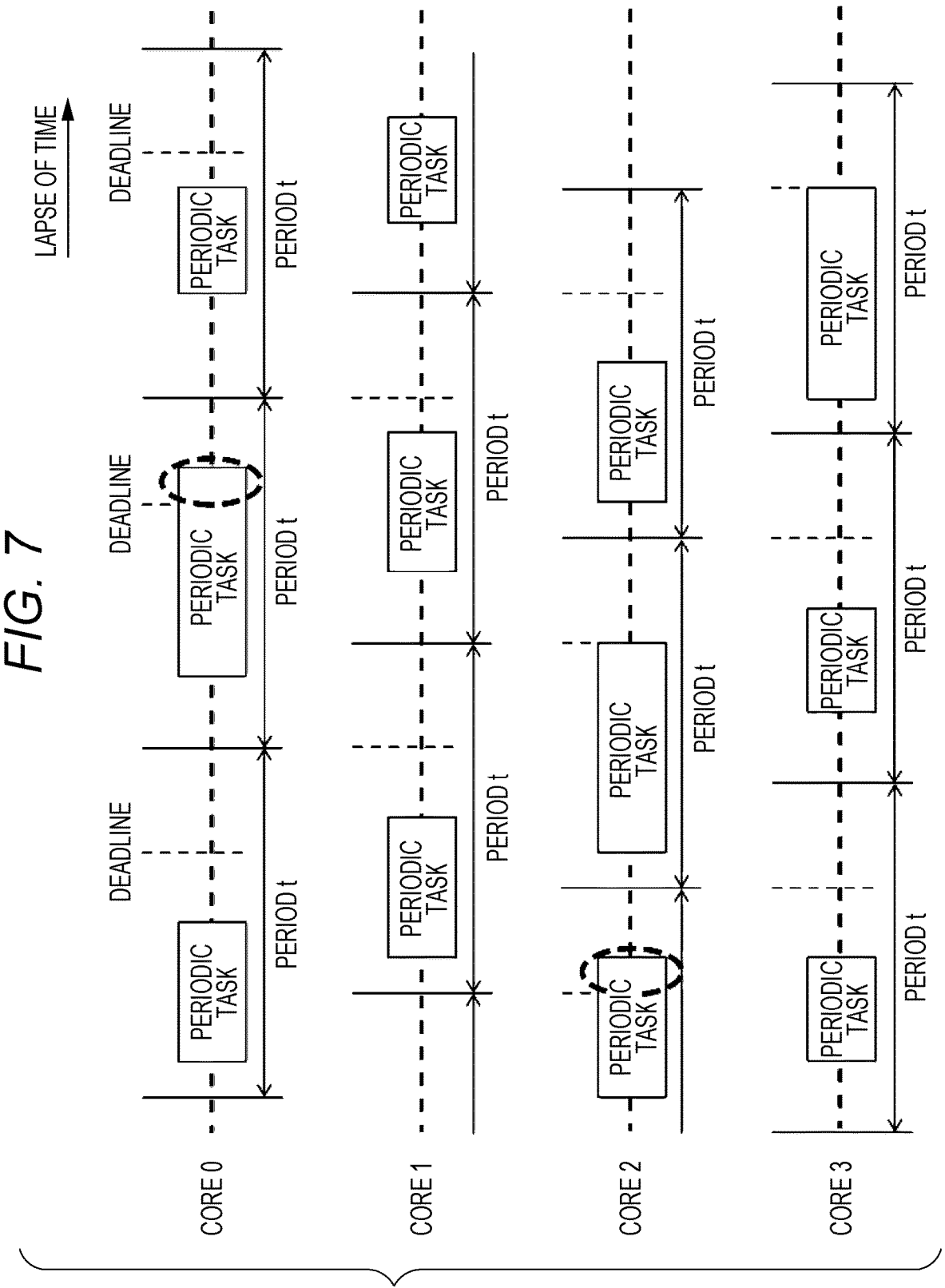
FIG. 7 is an explanatory diagram showing a situation where the schedule shown in FIG. 6 is executed according to the first embodiment of the present invention.

FIG. 7 is an explanatory diagram showing a situation where the schedule shown in FIG. 6 is executed according to this embodiment. In FIG. 7, tasks other than periodic tasks are not shown.

The periodic tasks assigned to the cores 1 through 4 of the multicore processor 110 are identical tasks. That is, the machine control application 220 generates identical periodic tasks, and hands over the generated periodic tasks to the OS 210, to perform scheduling of the periodic tasks to be executed by the cores 111 through 114 (the cores 1 through 4).

As indicated by a circle drawn with a heavy dashed line in FIG. 7, the periodic task executed second in the core 0 has "deadline-over", but the periodic tasks executed second in the cores 1 through 3 other than the core 0 do not have "deadline-over". Therefore, the machine control application 220 can perform machine control by employing the result of the periodic task process of one of the periodic tasks executed second in the respective cores 1 through 3. For example, the machine control application 220 can employ the result of the periodic task process completed first. Accordingly, even if the real-time properties of the periodic tasks are degraded in one core, the real-time properties of the periodic tasks are maintained in the other cores. Thus, the real-time properties required in machine control can be secured.

The periodic tasks registered in the same sequence in the respective cores 111 through 114 in FIG. 6 (the periodic tasks horizontally aligned timewise in FIG. 6) are not necessarily executed in synchronization with one another, as can be seen from FIG. 7. This is because the tasks assigned to the cores 111 through 114 are executed in an asynchronous manner in the cores 111 through 114. However, the identical periodic tasks to be executed by the respective cores may be synchronized with one another, so that the periodic tasks are executed in parallel among the cores.

Although the periodic tasks are assigned to all the cores 111 through 114 in the example illustrated in FIGS. 6 and 7, the real-time properties required in machine control can be secured as long as the periodic tasks are assigned to at least two cores among the cores 111 through 114.

As described above, the machine control application 220 can cause cores to execute periodic tasks by handing over the generated periodic tasks to the OS 210. At this point, the machine control application 220 can designate the cores to execute the periodic tasks, and the OS 210 assigns the periodic tasks to the designed cores. The machine control application 220 can designate the cores to execute the periodic tasks so that the periodic tasks are assigned only to the core 111 and the core 112 among the cores 111 through 114, for example.

Figure 8:
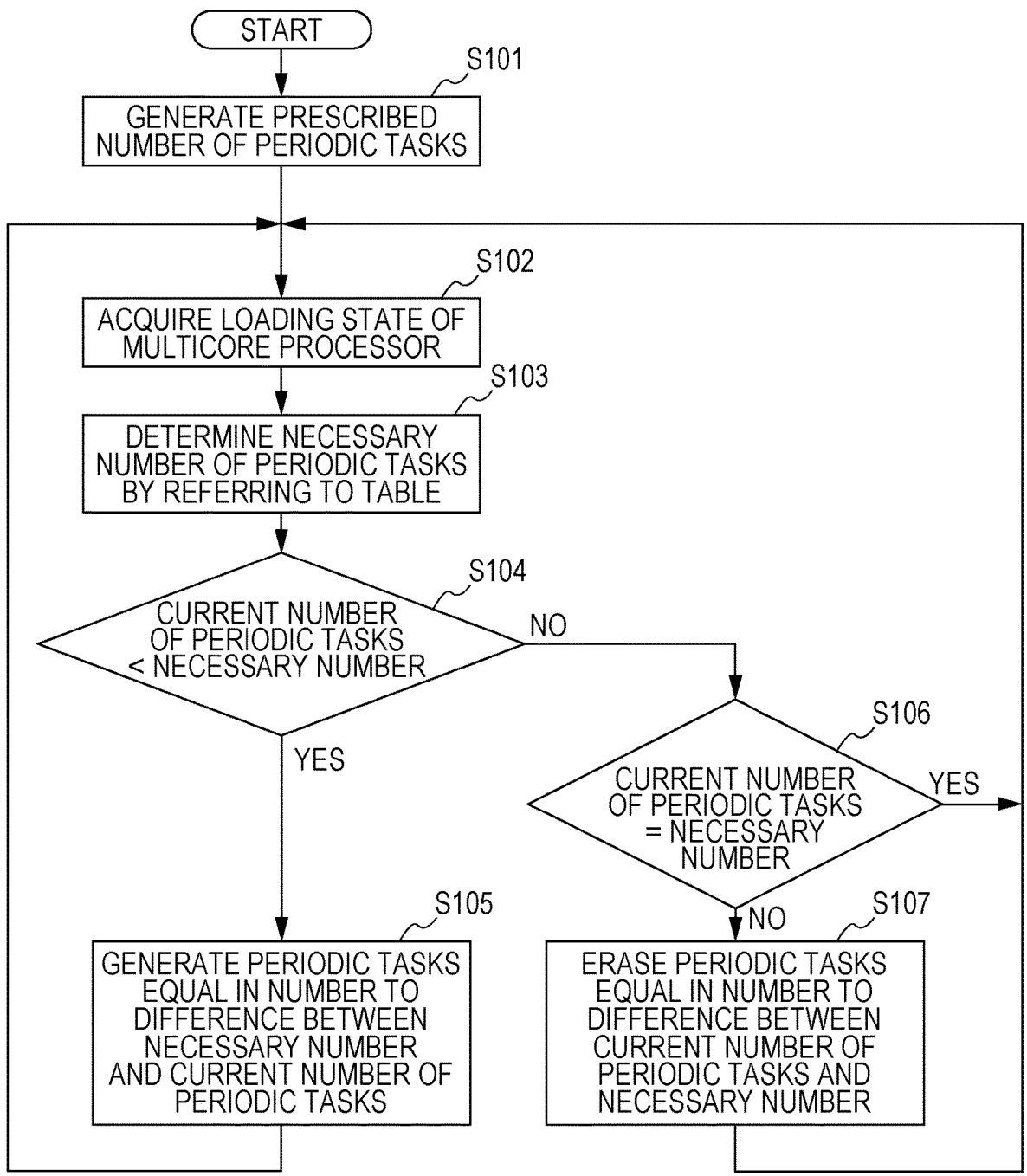
FIG. 8 is a flowchart showing a method of causing the multicore processor to execute tasks according to the first embodiment of the present invention.

FIG. 8 is a flowchart showing a method of causing the multicore processor 110 to execute tasks according to this embodiment. The method shown in this flowchart is realized by the multicore processor 110 executing the machine control application 220.

The machine control application 220 generates a prescribed number of periodic tasks (S101). The prescribed number may be "1", for example.

The machine control application 220 acquires the load condition of the multicore processor 110 (S102), and determines the number of necessary periodic tasks by referring to a table stored beforehand in the nonvolatile memory 130 (S103). The table can be created in the manner described below. The frequency of deadline-over of periodic tasks is measured in accordance with the load condition of the multicore processor 110. The number of necessary periodic tasks for securing real-time properties is determined based on the result of the measurement. The table is then created by associating load conditions with the numbers of necessary periodic tasks.

If the number of the currently generated periodic tasks is determined to be smaller than the number of necessary periodic tasks specified in the table (YES in step S104), the machine control application 220 generates the same number of periodic tasks as the difference between the number of necessary periodic tasks and the number of the currently generated periodic tasks (S105). With this, all the necessary periodic tasks are generated based on the load condition of the multicore processor 110, and the generated periodic tasks are executed by cores of the multicore processor 110.

If the number of the currently generated periodic tasks is determined to be larger than the number of necessary periodic tasks specified in the table (NO in step S104, and NO in step S106), the machine control application 220 erases the same number of periodic tasks as the difference between the number of necessary periodic tasks and the number of the currently generated periodic tasks (S107). With this, the necessary periodic tasks specified in the table are executed by cores of the multicore processor 110.

If the number of the currently generated periodic tasks is determined to be the same as the number of necessary periodic tasks specified in the table (NO in step S104, and YES in step S106), the machine control application 220 causes cores to execute the currently generated periodic tasks.

As described above, the cores 111 through 114 of the multicore processor 110 are caused to execute the minimum number of periodic tasks based on the load condition of the multicore processor 110. Accordingly, the real-time properties required in machine control can be secured while the utilization efficiency of the multicore processor 110 is increased.

This embodiment has the effects described below.

Identical periodic tasks are generated, and cores of a multicore processor are caused to execute the periodic tasks. Accordingly, even if the real-time properties of the periodic tasks are degraded in one core, the real-time properties of the periodic tasks are maintained in the other cores. Thus, in a case where a general-purpose OS is used in a multicore processor, the real-time properties required in machine control can be secured while functionality in the system control is maintained.

Furthermore, the number of the periodic tasks to be executed is determined based on the load condition of the multicore processor executing the periodic tasks. Accordingly, the real-time properties required in machine control can be secured, while utilization efficiency of the multicore processor is increased.

Second Embodiment

The following is a detailed description of an apparatus, a method, and a program for causing a multicore processor to execute tasks, and a recording medium storing the program according to a second embodiment of the present invention. This embodiment differs from the first embodiment in that the number of periodic tasks to be executed by each core of the multicore processor 110 is determined based on the operation mode of a job, while the number of periodic tasks to be executed by each core is determined based on the load condition of the multicore processor 110 in the first embodiment. The other aspects of this embodiment are the same as those of the first embodiment, and therefore, these aspects will not be described below or will be only briefly described.

Figure 9:
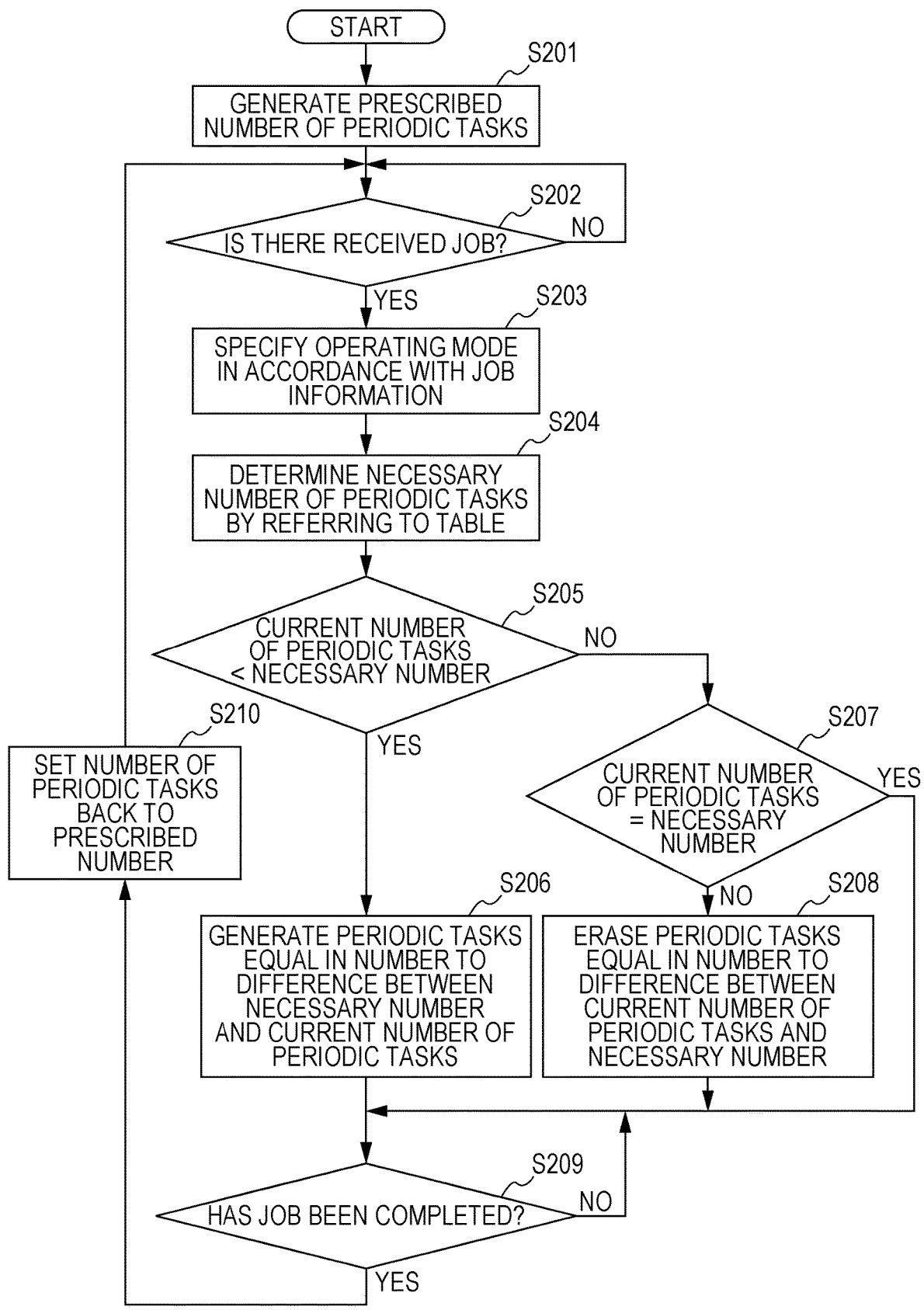
FIG. 9 is a flowchart showing a method of causing the multicore processor to execute tasks according to a second embodiment of the present invention.

FIG. 9 is a flowchart showing a method of causing the multicore processor 110 to execute tasks according to this embodiment. The method shown in this flowchart is realized by the multicore processor 110 executing the machine control application 220.

The machine control application 220 generates a prescribed number of periodic tasks (S201).

The machine control application 220 awaits reception of a job at the network unit 150 (S202). When a print job is received (YES in step S202), the machine control application 220 identifies the operation mode of the image forming apparatus 100 from the job information contained in the print job (S203). Other than the print job, the job may be a copy job, a scan job, or a FAX job, for example. The operation mode of the image forming apparatus 100 may indicate a job type, a processed image type such as full-color or monochrome, and a multiprocessing state such as simultaneous execution of printing and copying, for example.

Based on the identified operation mode, the machine control application 220 determines the number of necessary periodic tasks by referring to a table stored beforehand in the nonvolatile memory 130 (S204). The table can be created in the manner described below. The frequency of deadline-over of periodic tasks in the multicore processor 110 is measured for each operation mode. The number of necessary periodic tasks for securing real-time properties is determined based on the result of the measurement. The table is then created by associating the operation modes with the numbers of necessary periodic tasks.

If the number of the currently generated periodic tasks is determined to be smaller than the number of necessary periodic tasks specified in the table (YES in step S205), the machine control application 220 generates the same number of periodic tasks as the difference between the number of necessary periodic tasks and the number of the currently generated periodic tasks (S206). With this, all the necessary periodic tasks are generated based on the operation mode of the multicore processor 110, and the generated periodic tasks are executed by cores of the multicore processor 110.

If the number of the currently generated periodic tasks is determined to be larger than the number of necessary periodic tasks specified in the table (NO in step S205, and NO in step S207), the machine control application 220 erases the same number of periodic tasks as the difference between the number of necessary periodic tasks and the number of the currently generated periodic tasks (S208). With this, the necessary periodic tasks specified in the table are executed by cores of the multicore processor 110.

If the number of the currently generated periodic tasks is determined to be the same as the number of necessary periodic tasks specified in the table (NO in step S205, and YES in step S207), the machine control application 220 causes cores to execute the currently generated periodic tasks.

As described above, the cores 111 through 114 of the multicore processor 110 are caused to execute the minimum number of periodic tasks based on the operation mode of the image forming apparatus 100. Accordingly, the real-time properties required in machine control can be secured while the utilization efficiency of the multicore processor 110 is increased.

When the job is determined to have been completed (YES in S209), the machine control application 220 returns the number of periodic tasks to the prescribed number (S210), and awaits reception of the next job (S202).

This embodiment has the effects described below.

The number of periodic tasks is determined based on the operation mode of the image forming apparatus. Accordingly, the real-time properties required in machine control can be secured, while utilization efficiency of the multicore processor is increased.

The present invention is not limited to the above described embodiments.

For example, in the above described embodiments, the methods shown in the flowcharts in FIGS. 8 and 9 are realized by a multicore processor executing a machine control application. However, some or all of the functions to be realized by executing a machine control application may be replaced with hardware such as a circuit.

Further, in FIG. 7, identical periodic tasks are executed by all the cores of a multicore processor. However, identical periodic tasks may be executed by at least two cores, and the number of cores to execute periodic tasks may be limited as necessary.

In the above described embodiments, tasks are executed by a multiprocessor mounted in an image forming apparatus. However, the apparatus in which the multicore processor is mounted may be an apparatus that performs machine control on the machine unit of the apparatus through periodic tasks, or may be a material processing apparatus, for example.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An apparatus comprising a control unit, the control unit including:
    a memory storing an operating system, a system control application generating system control tasks for system control of data processing, and a machine control application for machine control, said machine control comprising detecting malfunction of at least one machine component of the apparatus; and
    a multicore processor having a plurality of cores;
    the control unit being configured to, under the operating system:
    generate a plurality of identical periodic tasks of periodically performing a predetermined process related to the machine control; and
    cause at least two cores of the multicore processor to execute the generated identical periodic tasks, wherein the number of identical periodic tasks to be generated is predetermined based on a load condition of the multicore processor.

2. The apparatus according to claim 1, wherein the data processing of the system control includes data processing of at least one of image, network, or job management.

3. A non-transitory recording medium storing a computer readable program as a machine control application to be executed for performing machine control, said machine control comprising detecting malfunction of at least one machine component of the apparatus in an apparatus capable of executing a system control application under a general-purpose operating system, the system control application generating system control tasks for system control of data processing, the program causing a multicore processor to:
    generate a plurality of identical periodic tasks of periodically performing a predetermined process related to the machine control; and
    cause at least two cores of the multicore processor to execute the generated periodic tasks, the multicore processor having a plurality of cores including the at least two cores;
    wherein the number of identical periodic tasks to be generated is predetermined based on a load condition of the multicore processor.

4. The non-transitory recording medium storing a computer readable program according to claim 3, wherein the data processing of the system control includes data processing of at least one of image, network, or job management.

5. A method implemented in an apparatus capable of executing a system control application generating system control tasks for system control of data processing and a machine control application for machine control, said machine control comprising detecting malfunction of at least one machine component of the apparatus under a general-purpose operating system, the method comprising:
    generating a plurality of identical periodic tasks of periodically performing a predetermined process related to the machine control; and
    causing at least two cores of a multicore processor to execute the generated periodic tasks, the multicore processor having a plurality of cores including the at least two cores;
    wherein the number of identical periodic tasks to be generated is predetermined based on a load condition of the multicore processor.

6. The method according to claim 5, wherein the data processing of the system control includes data processing of at least one of image, network, or job management.

7. An image forming apparatus for forming print jobs on a recording medium, the image forming apparatus comprising:
    a photosensitive drum;
    a charging unit, an optical writing unit, a development device, and a drum cleaner, which are placed around the photosensitive drum to generate images on the photosensitive drum;

a sheet conveying unit for conveying a sheet onto which the image is transferred, and a control unit, the control unit including:

a memory storing an operating system, a system control application generating system for controlling tasks for managing generating images on the photosensitive drum, and a machine control application for detecting malfunction of the sheet conveying unit; and a multicore processor having a plurality of cores;

the control unit being configured to, under the operating system:

generate a plurality of identical periodic tasks of periodically performing a predetermined process related to the machine control application; and cause at least two cores of the multicore processor to execute the generated identical periodic tasks;

wherein the number of identical periodic tasks to be generated is predetermined based on a load condition of the multicore processor.

* * * * *